(12) United States Patent
Keller

(10) Patent No.: US 9,540,042 B2
(45) Date of Patent: Jan. 10, 2017

(54) STEERING METHOD AND INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 0 days.

(21) Appl. No.: 14/653,268

(22) PCT Filed: Nov. 20, 2013

(86) PCT No.: PCT/EP2013/074239
§ 371 (c)(1),
(2) Date: Jun. 18, 2015

(87) PCT Pub. No.: WO2014/095212
PCT Pub. Date: Jun. 26, 2014

(65) Prior Publication Data
US 2015/0353130 A1 Dec. 10, 2015

(30) Foreign Application Priority Data

Dec. 20, 2012 (DE) .................... 10 2012 112 743

(51) Int. Cl.
| | |
|---|---|
| *B62D 7/14* | (2006.01) |
| *B62D 7/15* | (2006.01) |
| *B66F 9/075* | (2006.01) |
| *B66F 17/00* | (2006.01) |
| *B60K 31/00* | (2006.01) |

(52) U.S. Cl.
CPC ........... *B62D 7/142* (2013.01); *B60K 31/0075* (2013.01); *B62D 7/159* (2013.01); *B66F 9/07568* (2013.01); *B66F 17/003* (2013.01)

(58) Field of Classification Search
CPC ..... B62D 7/142; B62D 7/159; B60K 37/0075; B66F 9/07568
USPC ................ 180/242, 233, 252, 253, 6.48, 6.5
See application file for complete search history.

(56) References Cited

U.S. PATENT DOCUMENTS

| | | |
|---|---|---|
| 3,998,288 A | 12/1976 | Aoki |
| 4,354,568 A | 10/1982 | Griesenbrock |
| (Continued) | | |

FOREIGN PATENT DOCUMENTS

| | | |
|---|---|---|
| DE | 1 430 317 A | 5/1970 |
| DE | 24 43 181 A1 | 11/1975 |
| (Continued) | | |

*Primary Examiner* — Joseph Rocca
*Assistant Examiner* — Marlon A Arce
(74) *Attorney, Agent, or Firm* — Norman B. Thot

(57) ABSTRACT

A steering method for an industrial truck includes providing the industrial truck comprising at least two driven wheels configured to run in different tracks when moving in a longitudinal travel direction, each of the at least two driven wheels comprising a drive system. At least one first wheel of the at least two driven wheels is configured to be steerable in the longitudinal travel direction. At least one second wheel of the at least two driven wheels is configured to initially run on an inside during a cornering. The drive system of the at least one second wheel is disengaged from the longitudinal travel direction when a predetermined steering angle of the at least one first wheel is reached.

5 Claims, 3 Drawing Sheets

(56) References Cited

U.S. PATENT DOCUMENTS

| | | | |
|---|---|---|---|
| 6,189,641 B1* | 2/2001 | Azuma | B60K 17/10 180/242 |
| 2010/0230201 A1* | 9/2010 | McVicar | B66F 9/07568 180/308 |
| 2011/0127093 A1* | 6/2011 | Koga | B62D 11/003 180/6.24 |
| 2013/0030656 A1 | 1/2013 | Keller | |

FOREIGN PATENT DOCUMENTS

| | | |
|---|---|---|
| DE | 29 09 667 C2 | 9/1980 |
| DE | 10 2010 016 4 | 10/2011 |
| EP | 2 508 403 A1 | 10/2012 |
| WO | WO 2008/141836 A1 | 11/2008 |
| WO | WO 2011/113127 A1 | 9/2011 |

* cited by examiner

———————— Electrical Control Line

— — — — — — Hydraulic Hose for Steering

—·—·—·—·— Hydraulic Hose for Drive Motor

STEERING METHOD AND INDUSTRIAL TRUCK

CROSS REFERENCE TO PRIOR APPLICATIONS

This application is a U.S. National Phase application under 35 U.S.C. §371 of International Application No. PCT/EP2013/074239, filed on Nov. 20, 2013 and which claims benefit to German Patent Application No. 10 2012 112 743.3, filed on Dec. 20, 2012. The International Application was published in German on Jun. 26, 2014 as WO 2014/095212 A1 under PCT Article 21(2).

FIELD

The present invention relates to a steering method for an industrial truck comprising at least two driven wheels running in different tracks when traveling longitudinally, of which at least one is steerable and at least one initially runs on the inside during cornering. The present invention also relates to such an industrial truck which comprises a device to influence the driving power of the driven wheels.

BACKGROUND

Such a steering method and such an industrial truck have previously been described in DE 10 2010 016 470 B4. DE 10 2010 016 470 B4 describes an industrial truck with three wheels. All wheels are disposed so as to be steerable about steering axes that are approximately perpendicular to the wheel axles and that extend approximately parallel to each other. The industrial truck includes the steering programs "longitudinal travel" and "transverse travel." A steering computer is provided to switch between longitudinal travel and transverse travel, oriented approximately perpendicularly thereto, via which the steering devices associated with the respective wheels can be acted on so that the wheels are in a neutral position of a steering element, for example, of a steering wheel in the straight-ahead position in the particular travel direction. In this position, all the rotational axes of the steered wheels run at least substantially parallel or congruently, in other words, the center of steering is in infinity.

All wheels of this vehicle can be driven by respective associated drive devices. These drive devices can in particular be electrically or hydraulically operated motors.

When this vehicle is in the "longitudinal travel" steering program, two of the wheels run in one and the same first track behind one another. The third wheel runs in the second track. Viewed in the longitudinal travel direction, this third wheel is located approximately between the two wheels running in the first track, and is thus also referred to as the "center wheel."

When the vehicle is travelling longitudinally, the steering devices of the two wheels running in the first track are steered in accordance with steering commands generated by the steering element. The center wheel is not steered.

When the industrial truck is steered out of longitudinal travel into cornering, during which the center wheel is initially located on the inside of the curve, the rotational speed of the center wheel is reduced compared to the wheels located on the outside of the curve. When turning in, the center of steering of the two wheels running in the first track increasingly approaches the steering axis of the center wheel. The center wheel must be stopped when the center of steering coincides with the steering axis of the center wheel.

When turning in further, the center wheel must finally rotate in the opposite direction, when the center of steering ends up between the center wheel and the wheels running in the first track, and the industrial truck thus rotates about a rotational axis located between the wheels and is thus in "carousel travel."

SUMMARY

An aspect of the present invention is to provide a steering method and an industrial truck which performs the above-described steering process while avoiding undesirable, uncontrolled vehicle states and excessive wear, especially of the wheels.

In an embodiment, the present invention provides a steering method for an industrial truck which includes providing the industrial truck comprising at least two driven wheels configured to run in different tracks when moving in a longitudinal travel direction, each of the at least two driven wheels comprising a drive system. At least one first wheel of the at least two driven wheels is configured to be steerable in the longitudinal travel direction. At least one second wheel of the at least two driven wheels is configured to initially run on an inside during a cornering. The drive system of the at least one second wheel is disengaged from the longitudinal travel direction when a predetermined steering angle of the at least one first wheel is reached.

BRIEF DESCRIPTION OF THE DRAWINGS

The present invention is described in greater detail below on the basis of embodiments and of the drawings in which:

FIG. 2 shows the detail II of FIG. 1, however, with the steerable wheel turned in.

DETAILED DESCRIPTION

Figure 1:
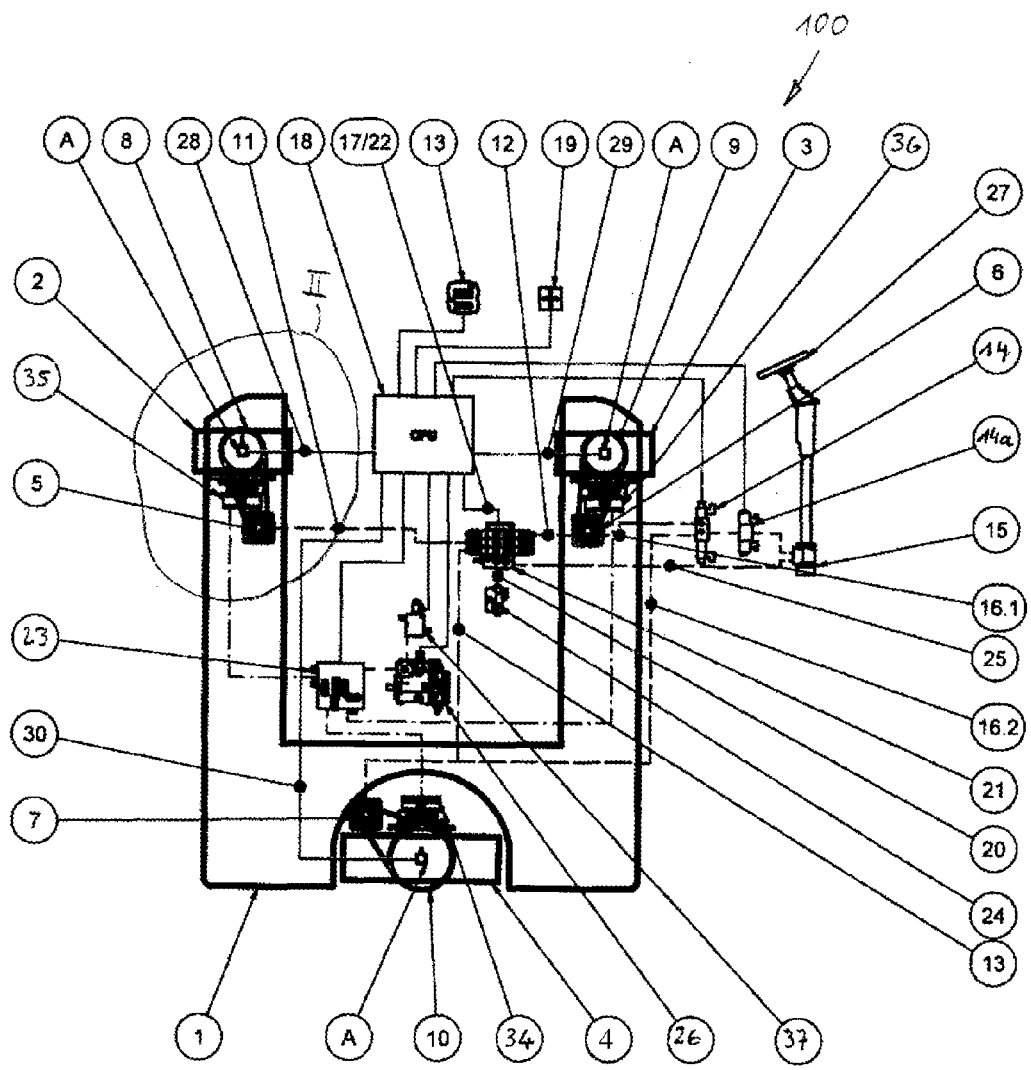
FIG. 1 schematically shows a block diagram of a steering system using the example of a three-wheeled industrial truck traveling longitudinally.

In the steering method according to the present invention, the drive system of the at least one wheel initially running on the inside during cornering, for example, the center wheel, is disengaged from the longitudinal travel position when the at least one steered wheel has reached a certain steering angle. The expression "wheel initially running on the inside during cornering" illustrates that, when turning in during cornering, this wheel runs on the inside until the center of steering defined by the steered wheels migrates between the steered wheels and the wheel running on the inside, and the industrial truck transitions into carousel travel. The expression "disengaged" shall be understood to mean that a driving torque no longer acts on the previously driven wheel. In an electric motor drive system, this can be achieved, for example, by deactivating the supply voltage, and, in a hydraulic drive system, by interrupting the supply of hydraulic fluid. As an alternative, it would also be possible to provide a switchable freewheel mechanism which disconnects the wheel from the drive device when the steering angle is reached.

This measure reliably prevents the wheels from scrubbing on the substrate during tight curve radii, all the way to carousel travel, which would increase the wear and tear on the wheels and could result in uncontrollable vehicle states of the industrial truck. The steering method of the present invention therefore provides for a "smooth" transition from cornering into carousel travel.

In an embodiment of the steering method of the present invention, the drive system of the at least one wheel initially running on the inside during cornering can, for example, be disengaged starting at approximately the steering angle of the at least one steerable wheel at which the industrial truck transitions into carousel travel around the wheel initially running on the inside. In other words, in this embodiment, the wheel initially running on the inside is driven as long as it must rotate due to the driving state of the industrial truck.

In an embodiment of the present invention, the driving power of the at least two driven wheels can, for example, be reduced when a certain steering angle is reached, which is in general smaller than the steering angle at which the industrial truck transitions from cornering into carousel travel. The travel speed of the industrial truck thus automatically decreases when a drop below a certain curve radius occurs, whereby the risk of the industrial truck reaching an uncontrolled driving state is again reduced.

Due to this automatic reduction in driving power, the driving power may no longer be sufficient to move the industrial truck across obstacles and/or across substrates that significantly increase rolling friction, in particular when the curve radii are small. This embodiment of the method according to the present invention can thus also include an option to deactivate the automatic reduction of the driving power, also referred to as "inching."

In an embodiment of the present invention, the increase in power of the at least two driven wheels can, for example, be carried out automatically when a drop below a certain curve radius occurs. For this purpose, the rotational speed of the at least one wheel initially running on the inside during cornering is recorded, and a control device for controlling the driving power within the meaning of an increase of the same is activated as soon as the rotational speed of the at least one wheel initially running on the inside during cornering drops below a predetermined minimum rotational speed. The need for a driver to intervene manually in the steering program to deactivate the "inch function" thus does not exist in this embodiment.

In an embodiment of the present invention, an angle detection device is provided on the industrial truck which generates a signal when a certain steering angle of at least one steerable wheel is detected and which is operatively connected to the device to influence the driving power, wherein the device to influence the driving power is designed so that the drive system of the at least one wheel initially running on the inside during cornering is interrupted when the signal is identified. For a "smooth" transition from tight cornering to carousel travel, it has been shown that it is not necessary to continuously reduce the driving power of the wheel initially running on the inside, but that it suffices to disengage this wheel as the driving state of the industrial truck approaches carousel travel. No reversal of the driving power is additionally required when the industrial truck transitions into carousel travel.

In an embodiment of the industrial truck according to the present invention, a hydraulic delivery pump can, for example, be provided to supply the driving power, and a respective hydraulic motor can, for example, be provided to drive each driven wheel. The driving power of the hydraulic motors can then be reduced by reducing the control oil pressure in the delivery pump, also referred to as the "drive pump."

In an embodiment of the present invention, the industrial truck can, for example, be a three-wheeled vehicle, the wheels of which are disposed so that, when traveling longitudinally, two wheels run approximately behind one another in one and the same track, and the third wheel runs in a different track, and that the two wheels are steerable to initiate cornering from longitudinal travel. The transition from tight cornering into carousel travel is possible in an industrial truck having such a wheel arrangement without having to steer the third wheel, also referred to as the "center wheel".

The angle detection device is then, for example, designed so that the signal is generated when the center of steering defined by the two steered wheels at least comes close to the steering axis of the third wheel as the curve radius decreases.

The present invention will be described below based on one exemplary embodiment.

The drawings schematically show the chassis 1 as an industrial truck, which is denoted overall by reference numeral 100. The industrial truck 100 comprises two wheels 2, 3 running in one track in the longitudinal travel direction and a third wheel 4 running in a second track. All wheels 2, 3, 4 are disposed steerable about axes A extending perpendicular to the drawing plane.

Respective hydraulic motors 5, 6, 7 associated with each of the wheels are provided for pivoting the wheels 2, 3, 4, the hydraulic motors 5, 6, 7 being hinged to the chassis 1 at one end and to a steering arm 8, 9, 10 at the other.

Each hydraulic motor 5, 6, 7 is connected to a steering block 21 by way of a hydraulic hose 11, 12, 13. This steering block 21 is a multi-valve assembly, which supplies the hydraulic motors 5, 6, 7 with hydraulic fluid as a function of the selected steering program. Depending on the selected steering program, the hydraulic fluid that is supplied by a steering orbitrol 15 can be directly conducted to individual hydraulic motors 6, 7 via hydraulic hoses 16.1, 16.2 so as to impart a driving state-dependent steering sensation to the driver.

An electrically actuatable switching valve 14 is interconnected between the steering orbitrol 15 and the steering block 21. The switching valve 14 is connected via a signal line 17 to a control unit 18, which is designed with a device for storing multiple steering programs (for example, longitudinal and transverse travel programs). The switching valve 14 is used to displace the wheels 2, 3, 4, into the starting position (when the steering element 27 is in the zero position) as a function of the respective selected steering program. In FIG. 1, this is the straight-ahead position while traveling longitudinally. If the "transverse travel" program is now selected, the switching valve 14 provides that all wheels 2, 3, 4 are pivoted 90° about the respective steering axis A.

Another control valve 14a is interconnected into the hydraulic hose and connected to the control unit 18. It is used to adjust the steering direction in which the steered wheels are during an actuation of the steering element 27, for example, during a rotational actuation of the steering wheel, to the travel direction so that the vehicle changes direction corresponding to the actuation of the steering element 27.

The steering block 21 is additionally connected via the signal line 17 to the control unit 18. The supply or removal of hydraulic fluid via the hydraulic hoses 11, 12, 13 to and from the hydraulic motors 5, 6, 7 is carried out as a function of the steering program, which the driver selects with the aid of an input device 19. The input device 19 can also be used to select the travel direction.

A hydraulic drive pump 26 is connected via an electric control line to the control unit 18. The hydraulic drive pump 26 is used to make pressurized hydraulic fluid available, which can be supplied to hydraulic drive motors 34, 35, 36, each of which is associated with a respective driven wheel.

A drive block 23 is interconnected into the hydraulic hoses between the drive motors 34, 35, 36 and the hydraulic drive pump 26, the drive block 23 likewise being connected to the control unit 18 via a signal line. The drive block 23 distributes the hydraulic oil flows to the hydraulic drive motors 34, 35, 36 in keeping with the respective selected steering program.

The steering block 21 comprises a control block segment, which in turn is likewise connected via a signal line 22 to a steering computer (not shown in the drawings). The control block segment of the steering block 21 is also used to process signals for switching the travel direction and influences the pressures and flows prevailing in the hydraulic hoses as a function of steering commands.

The control block segment of the steering block 21 is moreover connected via a hydraulic hose 20 to a priority valve 24. The hydraulic hose 20 is primarily used to supply the steering components with hydraulic oil. The steering block 21 is first supplied with hydraulic oil via the priority valve 24. An additional priority valve is integrated into the steering block 21, which supplies the steering orbitrol 15, also referred to as the steering unit, with hydraulic oil via hydraulic hose 25 as needed.

A steering element 27 in the form of a steering wheel mechanically connected to the steering orbitrol 15 is used to actuate the steering orbitrol 15 or the steering unit.

Angle sensors are provided on all wheels 2, 3, 4 and are connected via signal lines 28, 29, 30 to the control unit 18. The control unit 18 compares the actual steering angle data thus obtained to the target data to be expected based on the steering element 27 and the respective selected steering program and, if needed, activates the control block segment and/or the steering block 21 within the meaning of a target/actual value comparison.

For longitudinal travel of the industrial truck 100, to which the present invention relates, only the two wheels 2, 3 running in one track are steered, while the third wheel 4 (center wheel) remains without steering. Longitudinal travel is symbolized in FIG. 3 a) by the shown arrows. During this longitudinal travel, the center of steering is in infinity, or in other words, the rotational axes D2, D3 of the wheels 2, 3 do not intersect.

Figure 3:
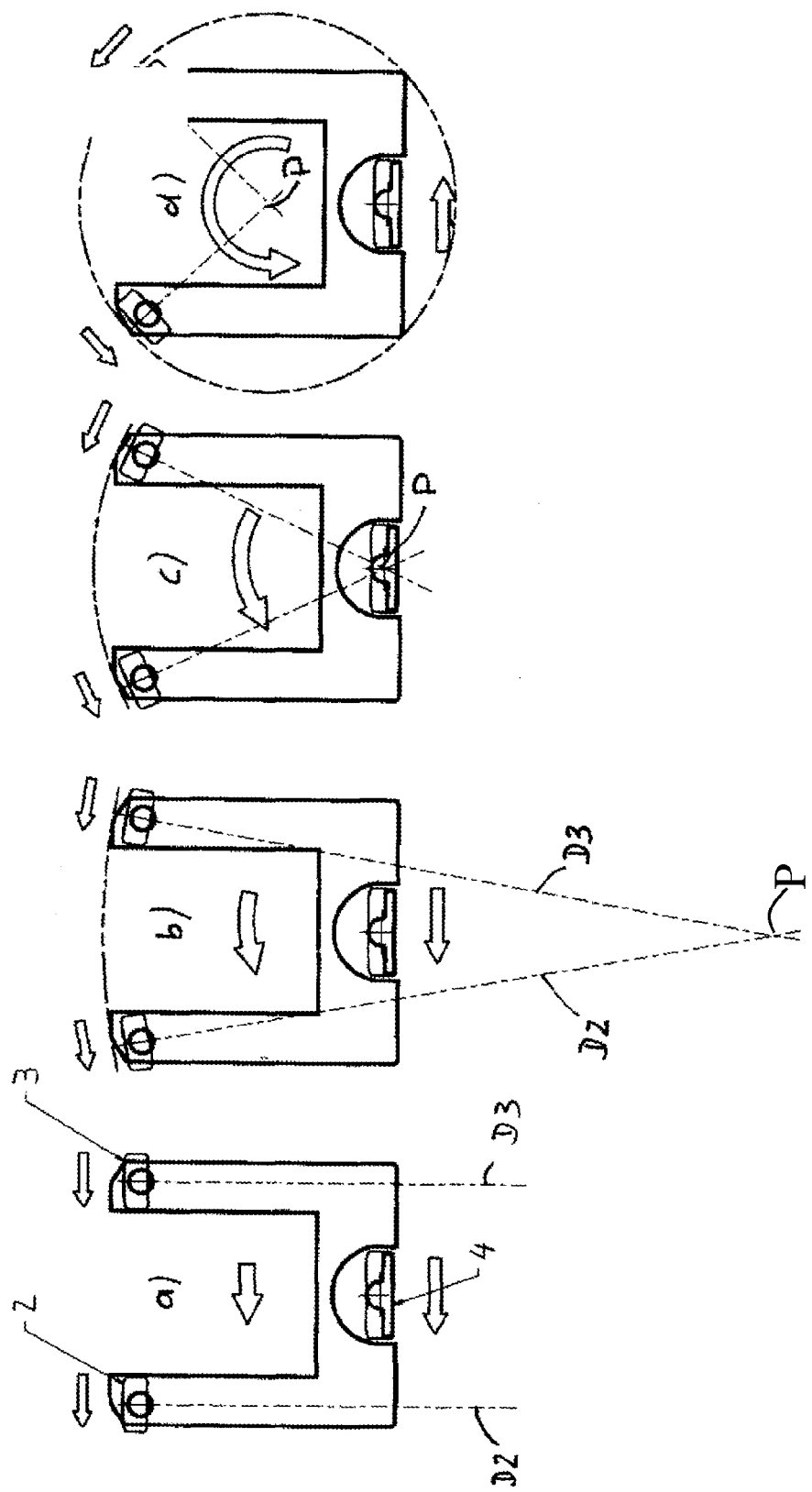
FIG. 3 *a*) to *d*) schematically show the three-wheeled industrial truck during straight-ahead travel and in three different steering situations.

If a steering actuation to the left is now carried out, as is symbolized in FIG. 3 b), the two wheels 2, 3 are rotationally actuated in the opposite direction of rotation, however, by the same angle, so that the rotational axes D2, D3 intersect at the center of steering P. The industrial truck 100 drives in a curve around the center of steering P, wherein the third wheel 4 (center wheel) must now cover a smaller distance than the wheels 2, 3.

If the wheel angle is increased, the center of steering P migrates toward the steering axis of the third wheel 4. Once the center of steering has reached the axis, as is shown in FIG. 3 c), the industrial truck 100 strives to rotate about the steering axis of the third wheel 4, which is to say to transition into carousel travel. At this moment, the third wheel 4 must come to a halt.

To prevent scrubbing of the wheels 2, 3, 4 on the substrate and the associated increased wear, and to prevent uncontrolled vehicle states, the drive system (not shown in the drawing) of the third wheel 4, which previously like the wheels 2, 3 was individually driven, is interrupted, for example, at the moment at which the center of steering P coincides with the steering axis of the third wheel 4, in a way that allows the third wheel 4 to thereafter rotate at least approximately freely.

If the wheel angle is now increased further, the center of steering P migrates between the third wheel 4 and the wheels 2, 3, and the vehicle rotates in carousel travel about the center of steering P. The third wheel 4 reverses the direction of rotation thereof compared to the original direction of rotation, in which it was itself rotationally driven. This is possible by the interruption the drive system of the third wheel 4, or in other words, by disengaging the drive system.

Figure 2:
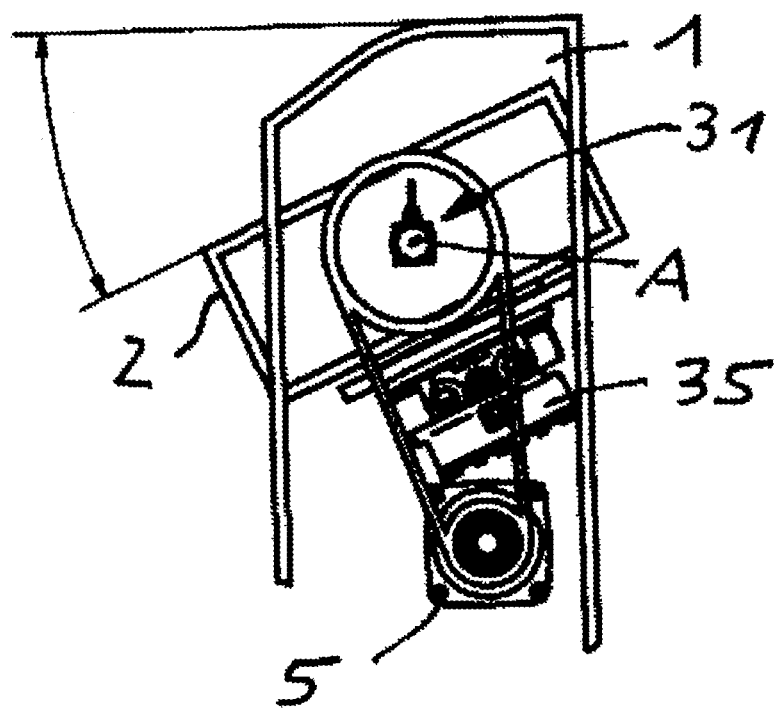

The disengagement of the third wheel 4, which during cornering according to FIG. 3 is the wheel initially running on the inside, is carried out when a certain steering angle of the steered wheels 2 and/or 3 is reached. For this purpose (as is schematically shown in FIG. 2 based on the example of the wheel 3) an angle detection device 31 is provided at least on one of the wheels 2, 3, the angle detection device 31 being connected via signal lines 28, 29 to the control unit 18, so that the drive device of the wheel 4 is deactivated by way of the control unit 18, or this wheel is disengaged, when the steering angle is reached at which the center of steering P coincides with the steering axis of the third wheel 4.

The industrial truck 100 according to the present invention is also provided with what is known as an "auto inch" device, the operating principle of which will be described below.

To improve handling when the wheel angle increases, and the curve radius thus decreases, the driving power that is applied to the hydraulic drive motors 34, 35, 36 is reduced starting at a certain steering angle, which can be predefined by the control unit 18. For example, the control oil pressure in the drive pump is reduced, whereby the volume flow delivered by the drive pump is decreased. An "auto inch valve" 37 is used for this purpose, which is connected to the control unit 18 via a signal line and to the hydraulic drive pump 26 via a hydraulic tube. The industrial truck 100 is thus decelerated. This process is carried out, for example, at curve radii between those shown in FIGS. 3 b) and c).

To prevent the industrial truck 100 from coming to a standstill on obstacles in tight radii due to the reduced driving power, however, a device is provided on the third wheel 4 for detecting the rotational speed thereof. If this device detects a rotational speed below a predefined minimum value, it generates a signal that is transmitted to a control unit 18, whereupon the driving power is increased.

The present invention is not limited to embodiments described herein; reference should be had to the appended claims.

LIST OF REFERENCE NUMERALS 100 industrial truck
1 chassis
2, 3 wheels
4 third wheel
5, 6, 7 hydraulic motor
8, 9, 10 steering arm
11, 12, 13 hydraulic hose
14 switching valve
14a control valve
15 steering orbitrol
16.1, 16.2 hydraulic hose
17 signal line
18 control unit
19 input device 20 hydraulic hose
21 steering block comprising a control block segment
22 signal line
23 drive block
24 priority valve
25 hydraulic hose
26 hydraulic drive pump
27 steering element
28, 29, 30 signal lines
31 angle detection device
34, 35, 36 hydraulic drive motors
37 auto inch valve
A axes
D2, D3 rotational axes
P center of steering

What is claimed is:

1. A steering method for an industrial truck, the method comprising:
providing the industrial truck comprising,
at least two driven wheels configured to run in different tracks when moving in a longitudinal travel direction, each of the at least two driven wheels comprising a drive system,
wherein,
at least one first wheel of the at least two driven wheels is configured to be steerable in the longitudinal travel direction, and
at least one second wheel of the at least two driven wheels is configured to initially run on an inside during a cornering;
disengaging the drive system of the at least one second wheel from the longitudinal travel direction when a predetermined steering angle of the at least one first wheel is reached;
reducing a driving power of the at least two driven wheels when the predetermined steering angle of the at least one first wheel is reached;
recording a rotational speed of the at least one second wheel; and
increasing the driving power of the at least two driven wheels when a drop below a predetermined minimum rotational speed occurs.

2. The steering method as recited in claim 1, the method further comprising:
disengaging the drive system of at least one second wheel at a steering angle of the at least one first wheel at which the industrial truck substantially transitions into a carousel travel around the at least one second wheel.

3. The steering method as recited in claim 1, wherein,
the industrial truck further comprises a drive pump,
the at least two driven wheels are further configured to be driven hydraulically, and
the method further comprises:
decreasing or increasing a control oil pressure in the drive pump so as to reduce or increase the driving power.

4. An industrial truck comprising:
three driven wheels configured to run in different tracks when moving in a longitudinal travel direction, each of the three driven wheels comprising a drive system, the three wheels consisting of consisting of two first wheels configured to be steerable in the longitudinal travel direction, and one second wheel configured to initially run on an inside during a cornering;
a driving power device configured to influence a driving power of the three driven wheels;
an angle detection device configured to generate a signal when a steering angle of the two first wheels are detected, the angle detection device being operatively connected to the driving power device; and
a steering program,
wherein,
the driving power device is configured to influence the driving power by interrupting the drive system of the one second wheel when the signal is identified,
the three wheels are disposed so that, when the industrial truck moves in the longitudinal travel direction, the two first wheels run substantially behind each another in a same first track, and the second wheel runs in a different second track,
the two first wheels are steerable to initiate the cornering from the longitudinal travel direction,
the two first wheels are disposed so as to be steerable about their steering axes by a respective steering angle of 90° in a base position as a function of the steering program, and
the angle detection device is configured so that the signal is generated when a center of steering defined by the two first wheels substantially meets a steering axis of the second wheel as a curve radius decreases.

5. The industrial truck as recited in claim 4, further comprising:
a delivery pump configured to supply the driving power; and
a respective hydraulic motor configured to drive each of the at least two driven wheels.

* * * * *